J. H. PENDLETON.
Coffee Polishing and Separating Machine.
No. 217,399. Patented July 8, 1879.
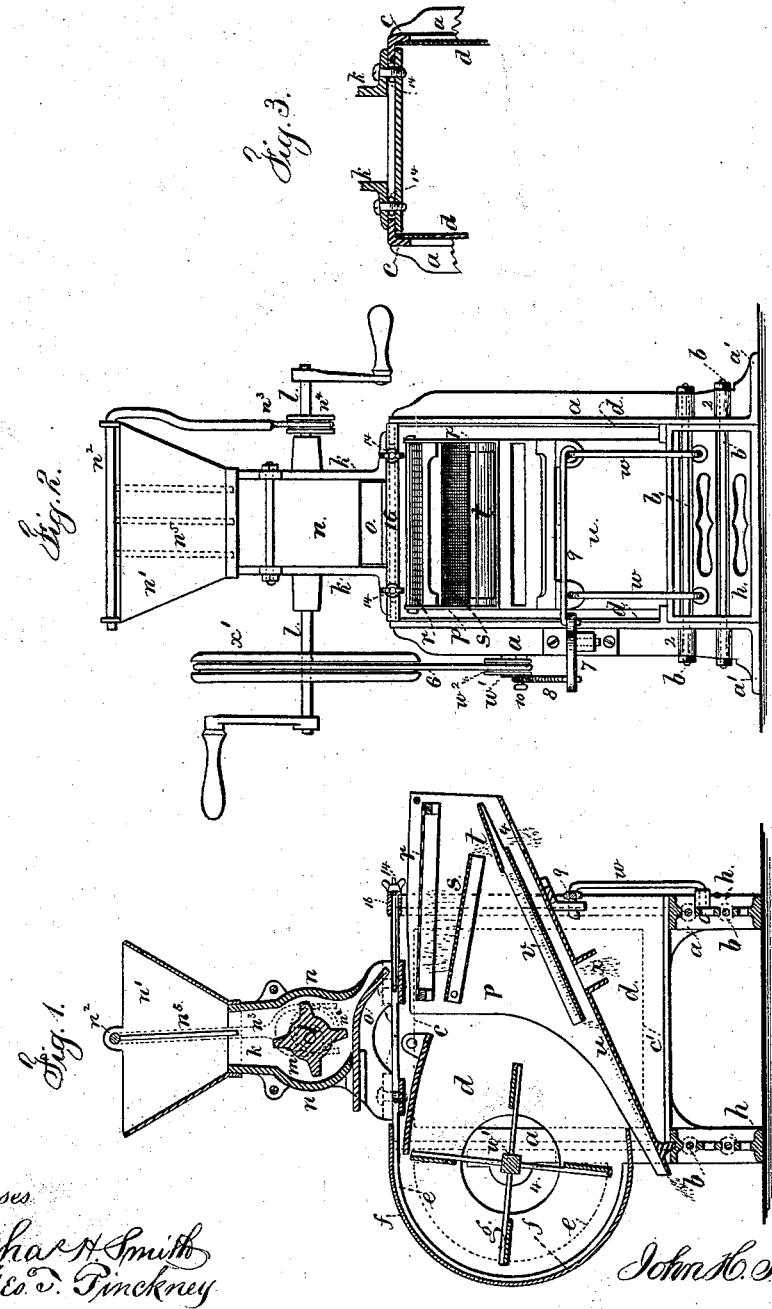

UNITED STATES PATENT OFFICE.

JOHN H. PENDLETON, OF BROOKLYN, ASSIGNOR TO HIMSELF, ALEXANDER H. TIERS, AND CORNELIUS TIERS, OF NEW YORK, N. Y.

IMPROVEMENT IN COFFEE POLISHING AND SEPARATING MACHINES.

Specification forming part of Letters Patent No. 217,399, dated July 8, 1879; application filed November 8, 1878.

*To all whom it may concern:*

Be it known that I, JOHN H. PENDLETON, of Brooklyn, in the State of New York, have invented an Improvement in Coffee Polishing and Separating Machines, of which the following is a specification.

The object of this invention is to separate coffee from the hulls, and clean the coffee from the silver skin that adheres to the berry, and separate the imperfect berries from the perfect ones.

My separator is made with reference to its use in countries where the coffee grows. In such countries the atmospheric influence is such that the wooden frames of the separators or fanning-machines become loose, warped, and often worms destroy them. The fanning mechanism runs with unnecessary friction, in consequence of changes in the frame, and the entire machine is quickly rendered useless.

This invention relates to a separating-machine in which the upper part is adapted to the reception of a movable hulling, polishing, or separating device that is adjustable with reference to the fan-shaft, so that one mechanism or the other may be placed upon the separator, and the belt from the fan to the huller or polisher may be tightened, as required. This machine is adapted to being driven by hand-power, if desired.

In the drawings, Figure 1 is a vertical section of the fanning and separating machine. Fig. 2 is an end view of the same; and Fig. 3 is a cross-section of the base of the polisher and top of the separator.

The frame of the machine is composed of the vertical-ribbed side posts, $a$, made of cast-iron, with flanged feet $a'$, that form a broad firm bearing, and there are bosses 2 2 for the bolt-holes through which the bolts $b$ $b$ pass. The posts $a$ are connected at top and bottom by the rails $c$ $c'$, so as to form side frames, into which sheet-metal panels $d$ are introduced and secured by rivets near the edges.

There is also an arch of metal, $e$, cast with the side frames, for the purpose of receiving the edge of the curved sheet metal $f$, forming the case of the revolving pan $g$, and the sheet-metal panels $d$ extend into this arch, and are made with openings at 4 to allow air to pass into the blower.

The side frames are held together by the bolts $b$, and there are cross-frames $h$ that determine the width of the machine, such cross-frames being made with flanged edges to strengthen the same and to take a bearing at the ends against the inner surfaces of the posts, and there are openings for the passage of the bolts $b$ through the said cross-frames $h$. By varying the length of these cross-frames $h$ the width of the separator may be increased or lessened to change the capacity of the machine.

The top part of the machine is adapted to receive a coffee-hulling machine—such as patented by me May 8, 1877, No. 190,614—when the coffee is in a condition to be separated as soon as hulled; but, as the hulls are often taken off at one time and the coffee allowed to dry previous to the separation, I generally employ a polisher, such as represented in the drawings, the same consisting of the side plates, $k$ $k$, with feet, which are bolted to the upper edges of the side frames, or to cross-bars that slide beneath those edges. There are hubs upon these side plates, through which the shaft $l$ passes, and there is a cylindrical rubber, $m$, upon this shaft, having wings or ribs upon its edges, and there is a space between the edges of these ribs and the case $n$ as wide as the longest measurement of the grains of coffee, so as not to injure them. The coffee is placed in the hopper $n'$, and the revolution of the rubber causes the material to pass down gradually, and also rubs and separates the skin from the berry. The delivery of the berry is regulated by the bottom slide, $o$, that is adjustable and moved and held by a lever, screw, or any suitable means, so that the coffee only passes out of the machine as fast as it is properly rubbed, and only as fast as the separator is adapted to operate upon the same.

In consequence of the rubber $m$ being at the bottom part of the case $n$, it revolves against the coffee-berries while in a compact mass, rendered so by the column of berries in the case and hopper; hence the action of the rubber is very efficient. At the same time the rubber acts as an agitator to give motion to the coffee and cause it to run out of the mouth between the slide $o$ and the case $n$.

Between the side frames of the separating machine there is a vibrating shoe, composed of the side plates, $p$ $p$, between which is the upper screen, $r$, second screen, $s$, inclines $t$ and $u$, and third screen, $v$. The coffee and refuse fall on the screen $r$, the meshes of which are large enough for the berries to pass through, but the hulls are retained and go off at the end by the action of the air-blast from the fan. All the materials that go through $r$ fall on the screen $s$, except light skins and refuse, that blow away, and the screen $s$ has meshes that prevent the coffee or pieces passing through; hence that which remains falls from the end of $s$ upon the incline $t$, that is in the opposite direction, and the motion of such materials is arrested and the coffee slides off $t$ upon the third screen, $v$. The blast, being the most powerful in its action at this part, carries away refuse over the upper edge of the incline $t$, and also blows seeds and small pieces of coffee out of the mouth at 4.

The coffee slides down the screen $v$ and falls away at the bottom end, and any defective grains or pieces that are small enough to go through the screen $v$ fall away at the mouth $x$ near the bottom of the incline into a separate receptacle, thus making three separations, besides blowing away the refuse.

The shoe is supported at its lower end upon one of the cross-frames $h$, and its upper end or mouth has vertical links or bars $w$, that are pivoted at their lower ends to the cross-frame, and at their upper ends to the shoe. This construction allows the separator to be vibrated with but little friction, and the bent lever 7, rods 8 and 9, and crank-pin 10 upon the pulley of the fan serve to shake the shoe and screens.

The band-wheel $x'$ upon the shaft $l$ is connected to the pulley $w^2$ upon the shaft $w^1$ of the fan by a belt, 6; and in order to tighten the belt the hulling or polishing machine can be drawn along. To allow for this movement I attach the feet of the polishing or hulling machine to cross-bars, the ends of which are in the grooves at the upper parts of the side frames, and there is a cross-piece, 16, that partially slips into such grooves, but is stopped against the frame, and the screw-rod 14 passes through this cross-piece 16, and is connected with one of the cross-pieces that support the huller or polisher. By this means the huller or polisher can be drawn toward the bar 16 and the belt tightened, and when the huller or polisher is to be removed the belt is slipped off, and the cross-pieces moved laterally along and out of the grooves. By the reverse movement a polisher or huller, with its cross-bars, is applied to this separator.

It is often necessary to agitate the materials in the hopper $n^1$. I employ for this purpose the rock-shaft $n^2$, with a forked arm, $n^3$, eccentric $n^4$, and fingers $n^5$, that are in the hopper and terminate near the rubber, and prevent the material clogging.

I claim as my invention—

1. The feeding, polishing, or hulling mechanism supported upon the separating-machine, and adapted to be moved on the same with reference to the fan-shaft, in combination with the band-wheel 4, pulley $w^2$, band 6, and tightening-screw 14, whereby the hulling or polishing machine may be placed and adjusted in relation to the fan-shaft, substantially as set forth.

2. The combination, with the feeding and rubbing mechanism, of a hopper, $n^1$, rock-shaft $n^2$, fingers $n^5$, forked lever-arm $n^3$, and actuating-eccentric $n^4$, substantially as set forth.

3. In a machine for separating coffee, the combination, with a hopper and case, of a revolving rubber in the lower part of the case to rub and agitate the coffee, and a movable slide below the rubber to regulate the flow of the coffee to the separating mechanism, substantially as set forth.

Signed by me this 6th day of November, A. D. 1878.

J. H. PENDLETON.

Witnesses:
GEO. T. PINCKNEY,
WILLIAM G. MOTT.